United States Patent Office 3,586,629
Patented June 22, 1971

3,586,629
METAL SALTS AS LUBRICANT ADDITIVES
Ferdinand P. Otto, Woodbury, and Frederick C. Frank, Glassboro, N.J., assignors to Mobil Oil Corporation
No Drawing. Filed Sept. 16, 1968, Ser. No. 760,089
Int. Cl. C10m 1/34, 1/32
U.S. Cl. 252—42.7
11 Claims

ABSTRACT OF THE DISCLOSURE

Alkaline earth metal salts of condensation products prepared from a hydroxy aromatic compound, an aldehyde and an amine produces improved high temperature detergent properties for industrial fluids.

BACKGROUND OF THE INVENTION

Field of the invention

This invention relates to metal salts as high temperature detergents, in particular, it relates to metal salts as engine oil detergents.

Description of the prior art

U.S. Pat. No. 3,368,972 discloses alkyl phenols or naphthols reacted with an aldehyde and an amine to produce condensation products having detergency properties. Similar compounds having shorter alkyl substituents on the phenol or naphthol nucleus do not have the corresponding detergent characteristics as do the higher molecular weight derivatives. U.S. 3,036,003 describes a mixture of an alkaline earth metal sulfonate and a phenol-aldehyde-amine condensation product. The condensation product would not be expected to have satisfactory detergent properties in low temperature operations.

SUMMARY OF THE INVENTION

It has now been discovered that by reacting (1) a condensation product of an alkyl hydroxy aromatic compound, an aldehyde, and an amine, or alkali metal salt thereof, with (2) an alkaline earth metal base, such as oxide, hydroxide, carbonate, carboxylate alkoxides, alcoholates and the like, or, respectively, the alkaline earth metal halide, the resulting alkaline earth metal salt provides excellent detergency characteristics to an organic industrial fluid.

DESCRIPTION OF SPECIFIC EMBODIMENTS

Broadly, the products of this invention may be produced by reacting an alkaline earth metal base with a typical condensation product described in U.S. 3,368,972. The reaction to produce these condensation products involves condensing an alkyl-substituted hydroxy aromatic compound, such as a phenol or naphthol, with an aldehyde and a nitrogenous compound having an HN< group at varying mole ratios. The range of mole ratios of phenol: aldehyde:HN< compound is in the range of 1:0.1 to 10:0.1 to 10.

Using formaldehyde and phenol as typical reactants, the following reactions may occur in accordance with this invention.

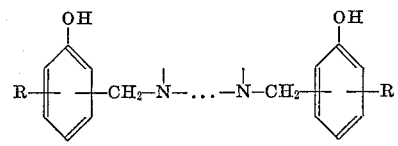

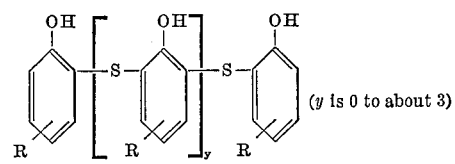

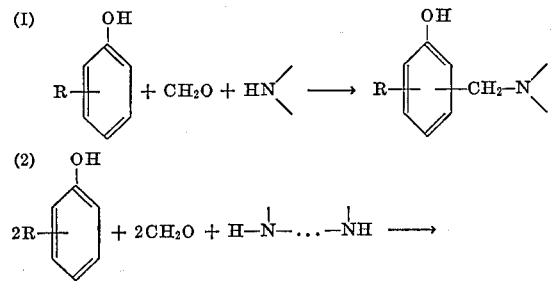

wherein R is a hydrocarbyl or substituted hydrocarbyl radical derived from a polyalkylene compound.

Representative of the hydroxy aromatic compound suitable for use in this invention are alkyl-substituted phenol, resorcinol, hydroquinone, catechol, chlorophenol, cresol, xylenol, hydroxy diphenyl, benzylphenol, phenylethylphenol, phenolic resins, guaiacol, alpha and beta naphthols, tolyl naphthols, xylylnaphthols, benzyl naphthol, phenylmethyl naphthols, phenanthrol, phenoxyphenols, phenol sulfides, such as ($y$ is 0 to about 3)

and the like.

The alkyl radical R is obtained by reacting the phenol or naphthol with a polyalkylene or polyolefin compound having at least 30 carbon atoms; preferably a polyolefin having a molecular weight of from 500 to about 5000, and more preferably from 700 to 1500. The polyolefin may be derived from an olefinic monomer of from 2 to 6 carbon atoms, preferably polypropylene, polybutylene and polyamylene. The aromatic nucleus may be substituted by one or more other alkyl substituents having equal or shorter alkyl chains. Other substituents, such as halo groups, may be present.

The hydroxy aromatic compound is reacted with the polyalkylene or polyolefin in the presence of an alkylating catalyst, preferably, boron trifluoride etherate or phenolate or phosphate complex. Other catalysts which may be used are boron trifluoride or hydrofluoric acid or aluminum chloride and other metallic Friedel-Crafts catalysts. The reaction may be conducted at from 80° to 250° C. The number of moles of phenol per polyolefin is in the range of about 0.1 to 10 and preferably from 0.5 to 2.

The aldehydes used in this reaction, include the aliphatic aldehydes, such as formaldehyde, acetaldehyde, propionaldehyde, butyraldehyde, valeraldehyde, stearaldehyde, aldol(beta-hydroxy butyraldehyde), acrolein, crotonaldehyde and the like; aromatic aldehyde including benzaldehyde, naphthoic aldehyde; and heterocyclic aldehydes, such as furfural. These aldehydes may contain other substituents, such as hydroxy groups (salicylaldehyde), halogen atoms (chloral), nitro or amino groups and the like. Aliphatic aldehydes, such as formaldehyde, and particularly paraformaldehyde are preferred.

The nitrogenous compound used in connection with forming the intermediate condensate product are those having the linkage HN<, i.e. at least one active hydrogen atom. The compounds contemplated in this invention include primary amines, secondary amines and polyamines containing both primary and secondary amino groups. Typical amines are the alkylene polyamines, such as ethylene diamine, propylene diamine, diethylene triamine, triethylene tetramine, tetraethylene pentamine, and the like. These amines may be straight or branched chain or cyclic aromatic amines may also be used, such as aniline, phenylene diamine, naphthyalene diamine in other isomeric forms. Acidic derivatives of amines, such as the monoamides or monoimides of dicarboxylic acids may be used. Included in this category is the monoimide of an alkenyl succinic acid wherein the alkenyl group of the succinoyl group may have from about 8 to about 300 carbon atoms, and a polyalkylene polyamine, such as an ethylene polyamine, e.g. tetraethylene pentamine. The amines may also include the amides of monocarboxylic acids having from 1 to about 20 carbon atoms, such as N-acetyl tetraethylene pentamine or the amide obtained from formic acid, propionic acid, butyric acid, stearic acid, oleic acid, cyclohexane, carboxylic acid, benzoic acid and the like. Reaction of amines with acids may also form a cyclic structure upon removal of an additional mole of water during the amide reaction. Thus this class of amines can be defined by the formula

wherein R is independently selected from the group consisting of hydrogen, hydrocarbyl, hydrocarbyl containing at least one amino group, acyl and a monoimide of an alkenylsuccinic acid wherein said alkenyl has from 8 to about 300 carbon atoms. Cyclic imides include the N-alkyl amine imidazolines. Other cyclic nitrogen compounds which may be used in this invention include a imidazolidine produced from a polyamine and an aldehyde, pyrimidine, morpholine, thiomorpholine, pyrrole, pyrroline, pyrrolidine, phenoxazine, indole, pyrazole, pyrazoline, piperidine, phenothiazine and other substituted analogs. These substituents may include side groups, such as alkyl, aralkyl, cycloalkyl, aryl, and alkaryl. In general, amines and polyamines having from 1 to about 50 carbon atoms may be used, preferably 1 to 20 per nitrogren atom. A further group of amines which may be used in this invention include the imines of polyolefins, such as polyethylene imines having a molecular weight in the range of about 500 to about 100,000.

After the reaction of the alkyl phenol, aldehyde and amine has taken place, preferably in accordance with the procedure of U.S. 3,368,972, the resulting product may be either separated from the reaction mixture or retained as is and further reacted with the alkaline earth metal base. This reactant includes the alkaline earth metal oxide, alkoxides, hydroxide, carbonate and carboxylate having from 1 to about 18 carbon atoms. U.S. Pat. No. 2,916,454 describes, for example, metal alcoholates, such as barium methylate. These metal alcoholates are among the metal bases used to carry out this invention. The structure of the final product is not known with certainty. It is believed that the metal base reacts with the hydroxy group on the aromatic nucleus. Alternatively an alkali metal hydroxide may be reacted with the phenol and the resulting alkali metal phenoxide in turn reacted with the alkaline earth metal halide. Either reaction may be conducted at a temperature of from about 50° to about 300° C. and preferably from about 100° to 200° C. The reactants are simply brought together in a suitable reactor and heated.

When the metal base is reacted with the condensation reaction product, it is added in sufficient amounts to provide preferably from 1 to about 5 equivalents of metal per mole of said condensation reaction product. It is believed the metal becomes directly and chemically combined in molecule. Excess metal, that is over the expected equivalent amount, may be introduced into the reaction product. This means is preferably achieved by adding the excess metal reactant in two or more steps and carbonating the reaction mixture with gaseous carbon dioxide between each such addition. Higher metal values may be obtained by this modification.

The products of this invention may be used in many forms of base media including lubricating oils, and greases made therefrom and hydrocarbon fuels. Petroleum mineral oils, gasoline, kerosene and the like and synthetic oils, such as ester hydrocarbon and silicone polymer fluids represent typical base media for these additives. These additives may also be used in the presence of other additives typically used in such fluids, namely, antioxidants, extreme pressure agents, pour point depressants and the like.

The following examples are intended to illustrate the invention more clearly.

EXAMPLE 1

To a reaction vessel equipped with a mechanical stirrer, thermometer and reflux condenser was added 6000 grams of a polypropylphenol, obtained from a reaction between polypropylene of about 800 molecular weights and phenol, similar to that described in U.S. 3,368,972. The reactor was heated and 396 grams (3.8 moles) of diethylenetriamine was added. Evidence of an exothermic reaction was noted and the heat was removed. The temperature rose to 83° C., at which time 150 grams (5.0 moles) of paraformaldehyde was added. The reaction mixture was then refluxed for four hours at 110° to 115° C. The reaction mixture was stripped to 155° C. pot temperature over a period of two hours and then under vacuum at 4 to 5 mm./Hg. to 170° C. for one hour. It was held at 170° to 175° C. for one hour. The product had the following analysis:

Percent N: Theory, 2.18; Found, 2.27.

EXAMPLE 2

To a reactor similar to that used in Example 1 was added 100 grams of the product of Example 1, 100 grams of a solvent-refined process oil, 6.2 grams of greasemakers lime (72.4% CaO) and 40 grams of distilled water. The reaction mixture was heated with stirring to 200° C. with the elimination of water over a two-hour period. The reaction product was mixed with 5% diatomaceous earth filter aid and filtered. The material obtained had the following analysis:

Percent: Calcium, 0.40; Nitrogen, 0.61.

EXAMPLE 3

To a reaction vessel similar to that used in Example 1 were added 100 grams of the product of Example 1 in 100 grams of solvent-refined process oil. To the contents were added 42.5 grams of barium methylate prepared in a manner similar to that described in U.S. Pat. No. 2,916,454. The barium methylate was added dropwise from a dropping funnel at 80° C. during the course of half an hour. The reaction product was topped to 150° C. and the product was filtered through diatomaceous earth filter aid. The product had the following analysis:

Percent: Barium, Theory, 2.7; Found, 2.45. Nitrogen, Theory, 0.73; Found, 0.72.

EXAMPLE 4

Half of the amount of reaction product before the filtration step of Example 3 was subjected to a carbonation for one hour at 150° C. using gaseous carbon dioxide. The product was filtered through diatomaceous earth filter aid. It had the following analysis:

Percent: Barium, 2.54; Nitrogen, 0.70; Carbon dioxide, 1.2.

EXAMPLE 5

To a reaction vessel similar to that used in Example 1 were added 750 grams of the product of Example 1 and 375 grams of solvent-refined process oil. The temperature was raised to 70° to 80° C. and 319 grams of barium methylate (containing 13% barium) was added dropwise. The reaction mixture was heated under a stream of nitrogen at 150° C., then it was carbonated with gaseous carbon dioxide at 150° C. for two hours. The reaction mixture was cooled to 80° C., and a second portion of 319 grams of barium methylate was added over one hour at from 70° to 80° C. The reaction mixture was heated to 150° C. under nitrogen thereby removing methanol. The reaction mixture was carbonated again with gaseous carbon dioxide at 150° C. for two hours and filtered through diatomaceous earth filter aid. The analysis of the product obtained therefrom was as follows:

Percent: barium, 6.46; nitrogen, 0.91; carbon dioxide, 2.2. Total base number, 83.0.

EVALUATION OF PRODUCTS

The products of this invention were tested in the Pyruvic Acid and Sulfuric Acid detergency tests described in U.S. 3,368,972, using the same base stock and concentrations, i.e. 3% of the product of this invention and 1% of a zinc dialkyl dithiophosphate. As a reference, an oil containing only the 1% zinc salt was also tested. The results were as follows:

| Novel additive | Pyruvic acid percent | Sulfuric acid |
|---|---|---|
| None (reference) | 58.6 | 0.102 |
| Product of Example 2 | 99.3 | 0.002 |
| Product of Example 3 | 99.0 | 0.002 |
| Product of Example 5 | 98.8 | 0.002 |

The products of this invention were tested in a Caterpillar Engine Test using a high sulfur fuel. In this test, a diesel fuel containing 1% sulfur is used to compare a single cylinder 4-cycle Caterpillar engine. The engine is operated under the following conditions:

Speed, r.p.m. ------------------------------- 1000
Brake load, HP ----------------------------- 19.8
Oil temperature, ° F. ------------------------ 150
Jacket temperature, ° F. --------------------- 150

The oil used to lubricate the engine is a solvent refined mineral oil containing 3% of a product of this invention and 1% of a zinc dialkyl dithiophosphate. For comparison purposes, an oil sample containing 0.5% of the zinc salt was also run and the results are given below:

| Additive | Hours | Piston rating | Lacquer demerits | Percent top groove packing |
|---|---|---|---|---|
| None | 120 | −132.7 | 179.3 | 6 |
| Product of Example 4 | 103 | 99.8 | 0.1 | 0 |
|  | 237 | 99.0 | 0.7 | 1.0 |
| Product of Example 5 | 240 | 96.9 | 1.0 | 22 |

The ratings in this test have the following scales. The piston rating scale is from 0 to 100, 100 indicating a clean rating; the clean rating for lacquer demerits and percent top groove packing is 0.

One of the products of this invention was also tested in the Lincoln MS Engine Test. The test oil sample consisted of a solvent-refined mineral oil containing 4.6% of the barium salt of Example 5 and 0.75% of the zinc dialkyldithiophosphate. This test is a low temperature test for determining the sludging, clogging and suspension characteristics of an engine oil. A 1957 Lincoln V-8 engine is operated on a 3-stage cycle consisting of 45 minutes of low temperature idle, two hours of intermediate temperature loaded operation and minutes of high temperature loaded operation. The cycle is conducted for 192 hours.

The conditions of the test are as follows:

|  | Stage | | |
|---|---|---|---|
|  | 1 | 2 | 3 |
| Oil sump temperature, ° F. (±5) | 120 | 175 | 205 |
| Speed, r.p.m. (±25) | 500 | 2,500 | 2,500 |
| Load, brake H.P. | 0 | 105 | 105 |

The results of this test are compared with those of a CRC Reference Engine Oil 132, containing 0.08% zinc, 0.075% phosphorus, 0.02% calcium, and having a kinematic viscosity at 210° F. of 11.15 cs. The oil stock containing the Example 4 product is an SAE 30 blend of two 150 and 200 second paraffinic stocks.

|  | Oil containing Example 4 product | Reference oil |
|---|---|---|
| Sludge (50=clean) | 36.9 | 21.6 |
| Percent oil ring clogging | 38 | 98 |
| Percent oil screen clogging | 5 | 99 |
| Piston rating (10=clean) | 7.1 | 5.9 |

The invention has been described in terms of specific embodiments and it should be understood that this description is by way of merely illustrating the invention without necessarily limiting it thereby.

The limitations of the invention only arise in the following claims.

We claim:
1. An organic fluid composition comprising a major proportion of an organic base medium selected from the group consisting of a lubricating oil and a liquid hydrocarbon fuel, and a minor proportion sufficient to impart detergent properties thereto of a reaction product selected from the group consisting of (1) the product of a reaction between (i) a condensation product of (a) a hydroxy aromatic compound selected from the group consisting of phenol, naphthol, phenanthrol, the lower alkyl-and the phenyl-(lower alkyl)-substituted members thereof, halophenol, hydroxyphenol, lower alkoxy-substituted phenol and phenol sulfides, which hydroxy aromatic compounds contain an alkyl substituent having a molecular weight of from 500 to about 5000, (b) an aldehyde, and (c) a nitrogenous compound having from 1 to about 50 carbon atoms selected from the group consisting of imidazolidine, pyrimidine, morpholine, thiomorpholine, pyrrole, pyrroline, pyrrolidine, phenoxazine, indole, pyrazole, pyrazoline, piperidine, phenothiazine, the hydrocarbyl-substituted members thereof, and amine compounds of the formula

in which R is independently selected from the group consisting of hydrogen, wherein not more than one R is hydrogen, hydrocarbyl, hydrocarbyl containing at least one amino group, acyl, and a monoimide of an alkenylsuccinic acid wherein said alkenyl contains from 8 to about 300 carbon atoms and (ii) an alkaline earth metal base, wherein said metal base is reacted with said condensation product by addition thereof in more than one step, and subjecting the intermediate reaction mixture to carbonation, and (2) the product of reaction between an alkali metal salt of the said condensation product and an alkaline earth metal halide.

2. The composition of claim 1 wherein the said alkyl substituent is derived from polypropylene.

3. The composition of claim 1 wherein the aldehyde is selected from the group consisting of formaldehyde and paraformaldehyde.

4. The composition of claim 1 wherein the amine is selected from the group consisting of ethylene diamine, diethylene triamine, triethylene tetramine, tetraethylene pentamine, the monoamide thereof and the N-alkyl imidazoline thereof.

5. The composition of claim 1 wherein the mole ratio of the reactants to produce said condensation product is from 1:0.1 to 10:0.1 to 10 of hydroxy aromatic compound:aldehyde:nitrogenous compound.

6. The composition of claim 1 wherein the alkaline earth metal base is a calcium base.

7. The composition of claim 1 wherein the alkaline earth metal base is a barium base.

8. The composition of claim 1 wherein from 1 to 5 equivalents of metal is added to said condensation product.

9. The composition of claim 1 wherein the said condensation product is produced from a polypropyl phenol, paraformaldehyde and an ethylene polyamine.

10. The composition of claim 1 wherein the nitrogenous compound is an alkenylsuccinimide of an ethylene polyamine.

11. The composition of claim 1 wherein the base medium is a lubricating oil.

References Cited
UNITED STATES PATENTS

| | | | |
|---|---|---|---|
| 2,916,454 | 12/1959 | Bradley et al. | 252—42.7 |
| 3,372,118 | 3/1968 | Rense | 252—42.7 |
| 3,429,812 | 2/1969 | Kivelevich et al. | 252—42.7 |
| 3,410,670 | 11/1968 | LeSuer | 44—78X |
| 3,256,183 | 6/1966 | Greenwald | 252—42.7X |
| 3,454,496 | 7/1969 | Schlombohm | 252—42.7X |

DANIEL E. WYMAN, Primary Examiner

W. H. CANNON, Assistant Examiner

U.S. Cl. X.R.

44—75

PO-1050
(5/69)

UNITED STATES PATENT OFFICE
CERTIFICATE OF CORRECTION

Patent No. 3,586,629     Dated June 22, 1971

Inventor(s) FERDINAND P. OTTO and FREDERICK C. FRANK

It is certified that error appears in the above-identified patent and that said Letters Patent are hereby corrected as shown below:

In column 5, line 64, before the word "minutes", insert -- 75 --.

Signed and sealed this 2nd day of November 1971.

(SEAL)
Attest:

EDWARD M. FLETCHER, JR.
Attesting Officer

ROBERT GOTTSCHALK
Acting Commissioner of Patents